US007871216B2

(12) United States Patent
Sasa

(10) Patent No.: US 7,871,216 B2
(45) Date of Patent: Jan. 18, 2011

(54) MEDIUM SUPPORTING MEMBER AND IMAGE FORMING APPARATUS

(75) Inventor: Masahiko Sasa, Nagoya (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 737 days.

(21) Appl. No.: 11/612,569

(22) Filed: Dec. 19, 2006

(65) Prior Publication Data

US 2007/0138418 A1 Jun. 21, 2007

(30) Foreign Application Priority Data

Dec. 19, 2005 (JP) ............................ 2005-365218

(51) Int. Cl.
*B41J 11/06* (2006.01)
*B65H 7/02* (2006.01)
*G01S 17/02* (2006.01)

(52) U.S. Cl. .......................... 400/648; 400/23; 400/48; 347/104; 250/559.18

(58) Field of Classification Search ............ 250/559.01, 250/559.18; 400/48
See application file for complete search history.

(56) References Cited

U.S. PATENT DOCUMENTS 3,824,613 A * 7/1974 Matsui ....................... 396/522
4,987,457 A * 1/1991 Mochizuki et al. .......... 399/331
5,084,719 A * 1/1992 Hara et al. ..................... 396/6
5,764,251 A * 6/1998 Hashimoto ................... 347/16
6,558,055 B1 * 5/2003 Shishido et al. ............. 400/248
6,918,709 B2 7/2005 Takeuchi et al.
2001/0004293 A1 * 6/2001 Iizuka ........................ 359/212
2005/0211931 A1 * 9/2005 Chelvayohan et al. ... 250/559.4
2006/0013632 A1 * 1/2006 Shimomura et al. ..... 400/120.02

FOREIGN PATENT DOCUMENTS

JP 58089542 A * 5/1983
JP 60039580 A * 3/1985
JP S60-039580 A 3/1985
JP 63104864 A * 5/1988
JP H02-131680 U 11/1990
JP 06102351 A * 4/1994

(Continued)

OTHER PUBLICATIONS

Japanese Patent Office, Office Action in Japanese Patent Application No. 2005-365218 (counterpart to the above-captioned U.S. patent application), mailed Dec. 2, 2008 (partial, English language translation provided).

*Primary Examiner*—Daniel J Colilla
(74) *Attorney, Agent, or Firm*—Baker Botts L.L.P.

(57) ABSTRACT

A medium supporting member, which is used in an image forming apparatus, includes: a plurality of ribs that support a recording medium; and an irradiation target portion that has a flat and smooth surface which is irradiated with a light by a light emitting unit of the image forming apparatus, wherein: a reflected light of the light emitted by the light emitting unit is detected by a light receiving unit of the image forming apparatus, and a presence or absence of the recording medium in the irradiation target portion is detected based on a quantity of the reflected light; and a distance between the irradiation target portion and the recording medium is increased in a direction from the light receiving unit to the light emitting unit.

8 Claims, 6 Drawing Sheets

FOREIGN PATENT DOCUMENTS

| | | | | |
|---|---|---|---|---|
| JP | 11251623 | A | * | 9/1999 |
| JP | 2004155197 | A | * | 6/2004 |
| JP | 2004255867 | A | | 9/2004 |
| JP | 2005-154097 | A | | 6/2005 |
| JP | 2005154097 | A | * | 6/2005 |
| JP | 2005317878 | A | * | 11/2005 |

* cited by examiner

MEDIUM SUPPORTING MEMBER AND IMAGE FORMING APPARATUS

CROSS-REFERENCE TO THE RELATED APPLICATION(S)

This application is based upon and claims priority from prior Japanese Patent Application No. 2005-365218 filed on Dec. 19, 2005, the entire contents of which are incorporated herein by reference.

TECHNICAL FIELD

The present invention relates to a medium supporting member that supports a recording medium, and to an image forming apparatus having the medium supporting member.

BACKGROUND

In the prior art, as an image forming apparatus for forming an image on a recording medium such as paper, there is known a position detection of the recording medium with a reflection type optical sensor. In the image forming apparatus an image is formed by alternately performing an action of moving the recording medium in an auxiliary scanning direction and an action of moving a carriage carrying a recording head in a main scanning direction. For example, a configuration is known in which the reflection type optical sensor is carried on the carriage. Here, the reflection type optical sensor is provided with a light emitting element for emitting a light and a light receiving element for detecting the reflected light of the light emitted by the light emitting element, so that the presence/absence of the recording medium in the irradiation target portion of the like is detected on the basis of the quantity of the reflected light detected by the light receiving element. Specifically, the light emitted by the light emitting element is reflected on the recording medium if this recording medium is present in the irradiation target portion. If the recording medium is not present in the irradiation target portion, the light is reflected on a platen for supporting the recording medium in a manner so as to confront the recording head. When the reflection on the recording medium and the reflection on the platen are different, it is possible to detect the presence/absence of the recording medium on the basis of the quantity of the reflected light. The recording medium usually has a white color, and it is decided that if the quantity of the reflected light is at a threshold value or larger, the recording medium is present and the platen of the black color is used. If the quantity of the reflected light is less than the threshold value, it is decided that the recording medium is not present. According to the image forming apparatus thus configured, the position of the side end portion of the recording medium can be detected by detecting the presence/absence of the recording medium while moving the position of the reflection type optical sensor in the main scanning direction. As a result, it is possible to adjust the position of the image precisely to the recording medium.

Even with the black platen, however, the quantity of the reflected light is not zero. Then, it is considered that the detection precision may be lowered by the influences of the reflected light in the state where the recording medium is not present in the irradiation target portion of the light.

Thus, a configuration, in which a sloped face is formed on the platen at the irradiation target portion of the light from a light emitting element, has been proposed in JP-A-2004-255867. With this configuration, the light from the light emitting element can be positively reflected by the sloped face in the direction having no light receiving element.

SUMMARY

Even in the image forming apparatus as set forth in JP-A-2004-255867, however, there arises a problem that the light reflected at random on the sloped face is detected by the light receiving element, if the light is reflected in a direction different from that which was intended.

Aspects of the present invention provide a medium supporting member that supports a recording medium, and an image forming apparatus having the medium supporting member, which improves a detection precision of a recording medium.

According to an aspect of the present invention, there is provided a medium supporting member, which is used in an image forming apparatus, the medium supporting member including: a plurality of ribs that support a recording medium; and an irradiation target portion that has a flat and smooth surface which is irradiated with light from a light emitting unit of the image forming apparatus, wherein: a reflected light of the light emitted by the light emitting unit is detected by a light receiving unit of the image forming apparatus; a presence or absence of the recording medium in the irradiation target portion is detected based on a quantity of the reflected light; and a distance between the irradiation target portion and the recording medium is increased in a direction from the light receiving unit to the light emitting unit.

According to another aspect of the present invention, there is provided an image forming apparatus including: a medium supporting member including an irradiation target portion that has a flat and smooth surface; a light emitting unit that emits a light toward the irradiation target portion; and a light receiving unit that detects the reflected light of the light emitted by the light emitting unit, wherein: a presence or absence of a recording medium in the irradiation target portion is detected based on a quantity of the reflected light; and a distance between the irradiation target portion and the recording medium is increased in a direction from the light receiving unit to the light emitting unit.

According to the above aspects, the smooth surface of the irradiation target portion suppresses random reflection, so that the light emitted from the light emitting unit is effectively reflected in a different direction. Further, the quantity of light detected by the light receiving unit can be remarkably reduced. As a result, it is possible to improve the detection precision of the recording medium.

DETAILED DESCRIPTION

An aspect according to the present invention is described as follows with reference to the accompanying drawings.

Figure 1:
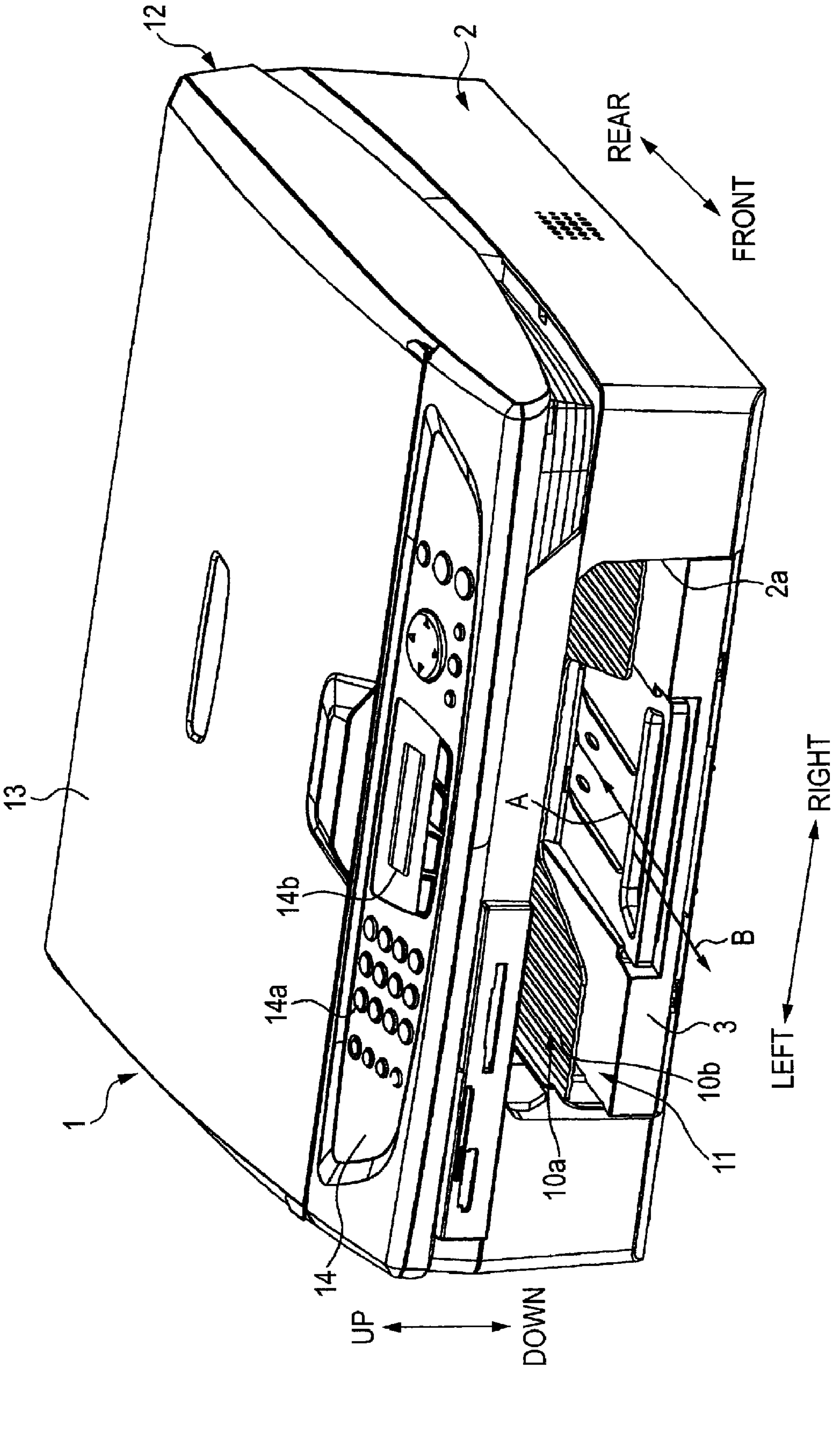
FIG. 1 is a perspective view showing the appearance of a complex apparatus of an aspect of the present invention.
Figure 2:
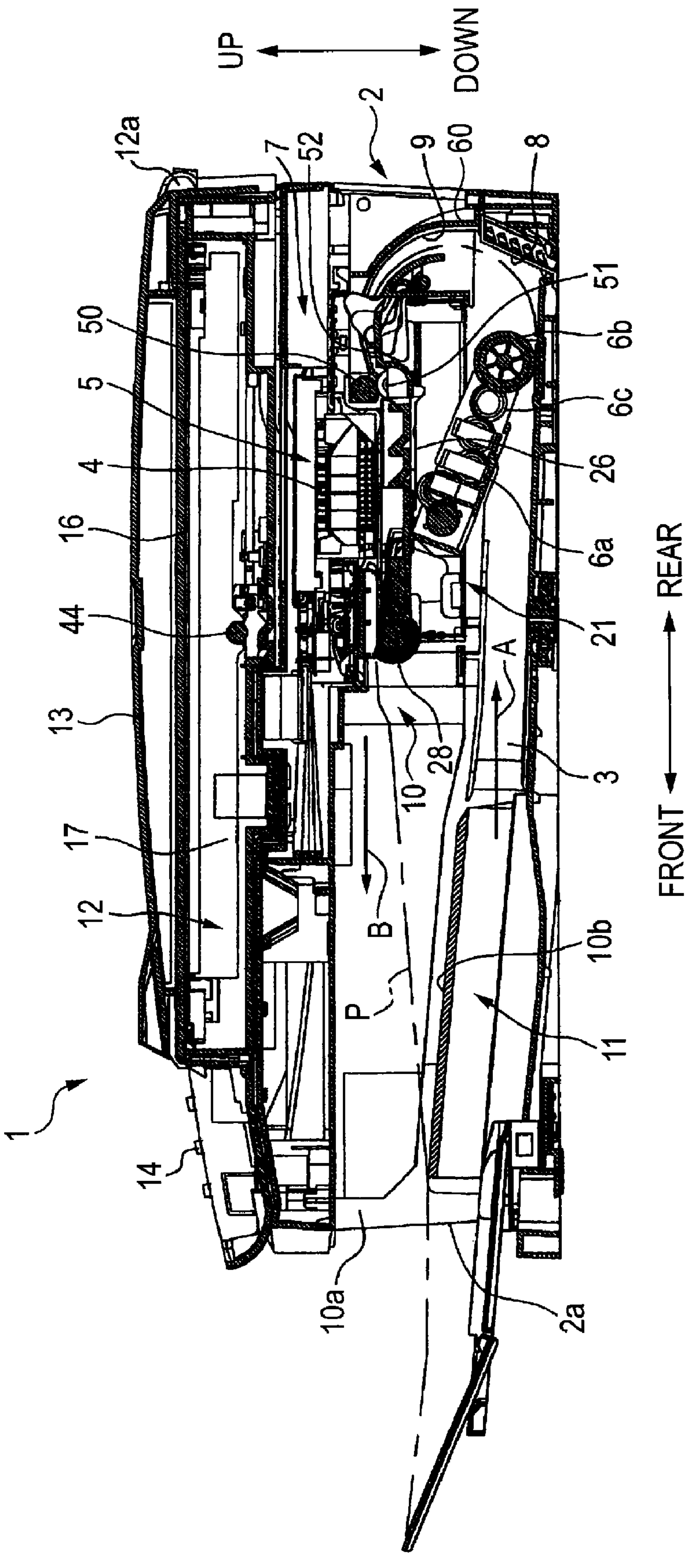
FIG. 2 is a sectional side elevation of the complex apparatus of FIG. 1.

FIG. 1 is a perspective view showing the appearance of a complex apparatus 1 as an image forming apparatus of an aspect of the present invention, and FIG. 2 is a sectional side elevation of the apparatus. In the following description, the vertical directions (top/bottom) are viewed relative to the ordinary use state (i.e., the state as shown in FIG. 1) of the complex apparatus 1; the depth directions are expressed by taking the side on which an operation panel unit 14 is disposed as the front side; and the rightward and leftward directions are expressed as viewed from the front side.

The complex apparatus 1 has the functions of a printer, a scanner, a color copier and a facsimile, and is provided, as shown in FIG. 1 and FIG. 2, with an image reading device 12 used for reading a document, in a housing 2 made of a synthetic resin.

The image reading device 12 is so disposed as can be opened and closed along hinges (not shown) disposed at its left end portion with respect to the housing 2. On the other hand, a document cover member 13 for covering the upper face of the image reading device 12 is so disposed as can be opened and closed with respect to the image reading device 12 on hinges (as referred to FIG. 2) disposed at its rear end portion.

On the upper face of the image reading device 12, as shown in FIG. 2, there is disposed a placing glass plate 16 for placing the document to be read, with the document cover member 13 being opened upward. On the lower side of the same, moreover, a contact image sensor (CIS) 17 for reading the document is so disposed as can reciprocate along a guide shaft 44 extending in the directions (i.e., the main scanning directions or the rightward and leftward directions) normal to the drawing of FIG. 2.

In front of the image reading device 12, as shown in FIG. 1 and FIG. 2, there is disposed the operation panel unit 14, which is equipped with an operation button group 14*a* for performing input operations, and a liquid crystal display (LCD) 14*b* for displaying various kinds of information.

In the bottom portion of the housing 2, there is disposed a paper feed unit 11 for feeding a recording paper sheet P as a recording medium. This paper feed unit 11 is provided with such a paper feed cassette 3 for housing the recording paper sheets P in a stacked (or accumulated) state through an opening 2*a* formed in the front side of the housing 2 as can be inserted into and extracted out of the housing 2. The paper feed cassette 3 is configured to house the recording paper sheets P of A4, letter, legal or post-card size such that they are stacked with their shorter side (or width) extending in the direction (i.e., the main scanning direction or the rightward or leftward direction) perpendicular to the paper feeding direction (i.e., the auxiliary scanning direction, the depth direction or the direction of arrow A).

On the deep side (or the back-end portion side) of the paper feed cassette 3, as shown in FIG. 2, there is arranged an inclined separating plate 8 for separating the recording paper sheets. This inclined separating plate 8 is formed in such a bulging shape in a top plan view as is protruded at the widthwise (or rightward or leftward) center portion of the recording paper sheets P and retracted as it goes to the two widthwise right and left end sides of the recording paper sheets P, and is equipped with a saw-toothed elastic separating pad for separating the recording paper sheets P by abutting against their leading end edges.

In the paper feed unit 11 and on the side of the housing 2, moreover, there is vertically and turnably mounted a root end portion of a paper feed arm 6*a* for feeding the recording paper sheets P from the paper feed cassette 3. The rotational drive force from a transfer motor (not shown) is transmitted to a paper feed roller 6*b* disposed at the leading end portion of the paper feed arm 6*a* by a gear transmission mechanism 6*c* disposed in the paper feed arm 6*a*. Thus, the recording paper sheets P, as stacked on the paper feed cassette 3, are separated and transferred one by one by the paper feed roller 6*b* and the elastic separation pad of the aforementioned inclined separating plate. The recording paper sheets P are thus separated to proceed along the paper feeding direction (or in the direction of the arrow A), through a transfer passage 9 having a transversely U-shaped path formed between a first transfer passage member 60 and a second transfer passage member 52, and to a recording unit 7 disposed above the paper feed cassette 3.

Figure 3:
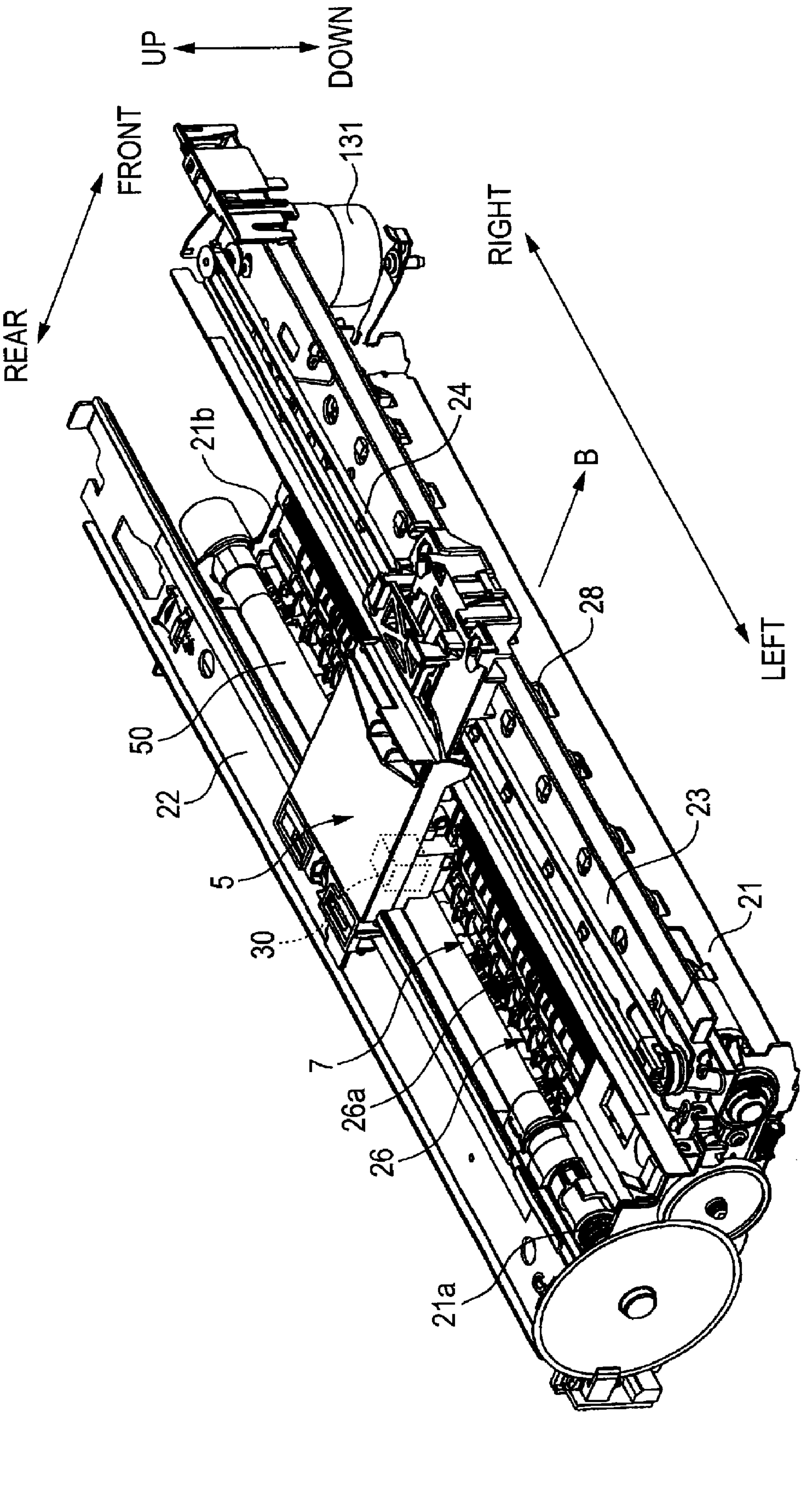
FIG. 3 is a perspective view of a recording unit of the complex apparatus according to the present invention.

FIG. 3 is a perspective view of the recording unit 7. As shown, the recording unit 7 includes: a main frame 21 formed into a opened-top box shape; an ink jet type recording head 4 (as shown in FIG. 2) supported by a pair of right and left side plates 21*a* and 21*b* and interposed between first and second guide members 22 and 23 of a transversely elongated plate shape extending in the transverse directions (or in the main scanning directions) for injecting ink from its lower face to record an image on the recording paper sheets P; a reflection type optical sensor 30; and a carriage 5 carrying the recording head 4 and the reflection type optical sensor 30.

The carriage 5 is slidably supported on the first guide member 2 on the upstream side of the paper discharging direction (or the direction of arrow B) and the second guide member 23 on the downstream side, so that it can reciprocate in the rightward and leftward directions. On the upper face of the second guide member 23 arranged on the downstream side of the paper discharging direction (or the direction of arrow B), moreover, a timing belt 24 is made to run in the main scanning direction (or in the transverse directions) as to reciprocate the carriage 5. A CR (carriage) motor 131 for driving the timing belt 24 is fixed on the lower face of the second guide member 23.

In the recording unit 7 and on the lower face of the recording head 4 in the carriage 5, a platen 26, which is flattened to extend transversely and which supports the recording paper sheets P while confronting the recording head 4, is fixed on the main frame 21 between the aforementioned two guide members 22 and 23.

On the upstream side of the platen 26 in the paper discharging direction (or in the arrow direction B), as shown in FIG. 2, a drive roller 50 and a nip roller 51 which underlies and confronts the drive roller 50 are arranged as transfer (or resist) rollers for transferring the recording paper sheets P to the upper face of the platen 26 (or to the lower face of the recording head 4). On the downstream side of the platen in the paper discharging direction (or in the arrow direction B), moreover, there are arranged a discharge roller 28, which is driven to transfer the recording paper sheets P from the recording unit 7 in the paper discharging direction to a paper discharge unit 10, and a spurred roller which is opposed to and urged toward the discharge roller 28.

On the other hand, the paper discharge unit 10, from which the recording paper sheets P recorded at the recording unit 7 are discharged with their recorded faces being directed upward, is arranged above the paper feed unit 11, and its paper discharge port 10*a* is opened commonly with the opening 2*a* in the front face of the housing 2. Moreover, the recording paper sheets P, as discharged in the paper discharging direction (or in the arrow direction B) from the paper discharge unit 10, are stacked and housed on a paper discharge tray 10*b* positioned in the opening 2*a*.

Here, the ink storage unit (not shown) is disposed at the front right-end position, covered by the image reading device 12, of the housing 2. In this ink storage unit, there are removably mounted four ink cartridges, which house four colors of ink (i.e., black (Bk), cyan (C), magenta (M) and yellow (Y)) for full-color recording. The ink cartridges can be inserted and extracted with the image reading device 12 being opened upward. Moreover, the ink cartridges of the individual colors and the aforementioned recording head 4 are connected through four flexible ink feed pipes, so that the colors of ink contained in the individual ink cartridges are fed through the individual ink feed pipes to the recording head 4.

Figure 4:
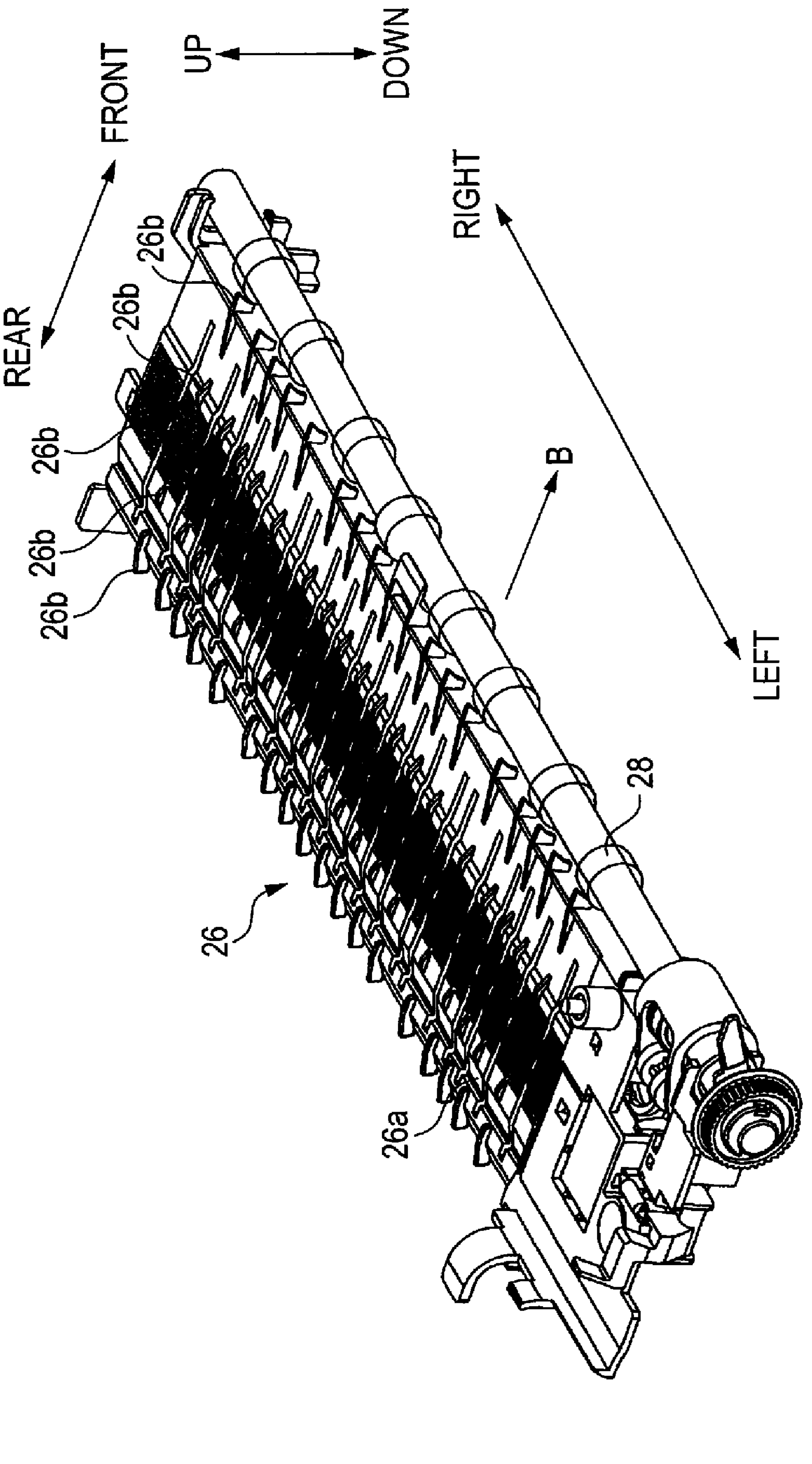
FIG. 4 is a perspective view of a platen of the complex apparatus according to the present invention.

Next, the specific configurations of the reflection type optical sensor 30 and the plate 26 are described in detail with reference to FIG. 3 to FIG. 5. FIG. 4 is a perspective view of the platen 26, and FIG. 5 is a sectional side elevation showing the schematic configurations of the reflection type optical sensor 30 and the platen 26.

Figure 5:
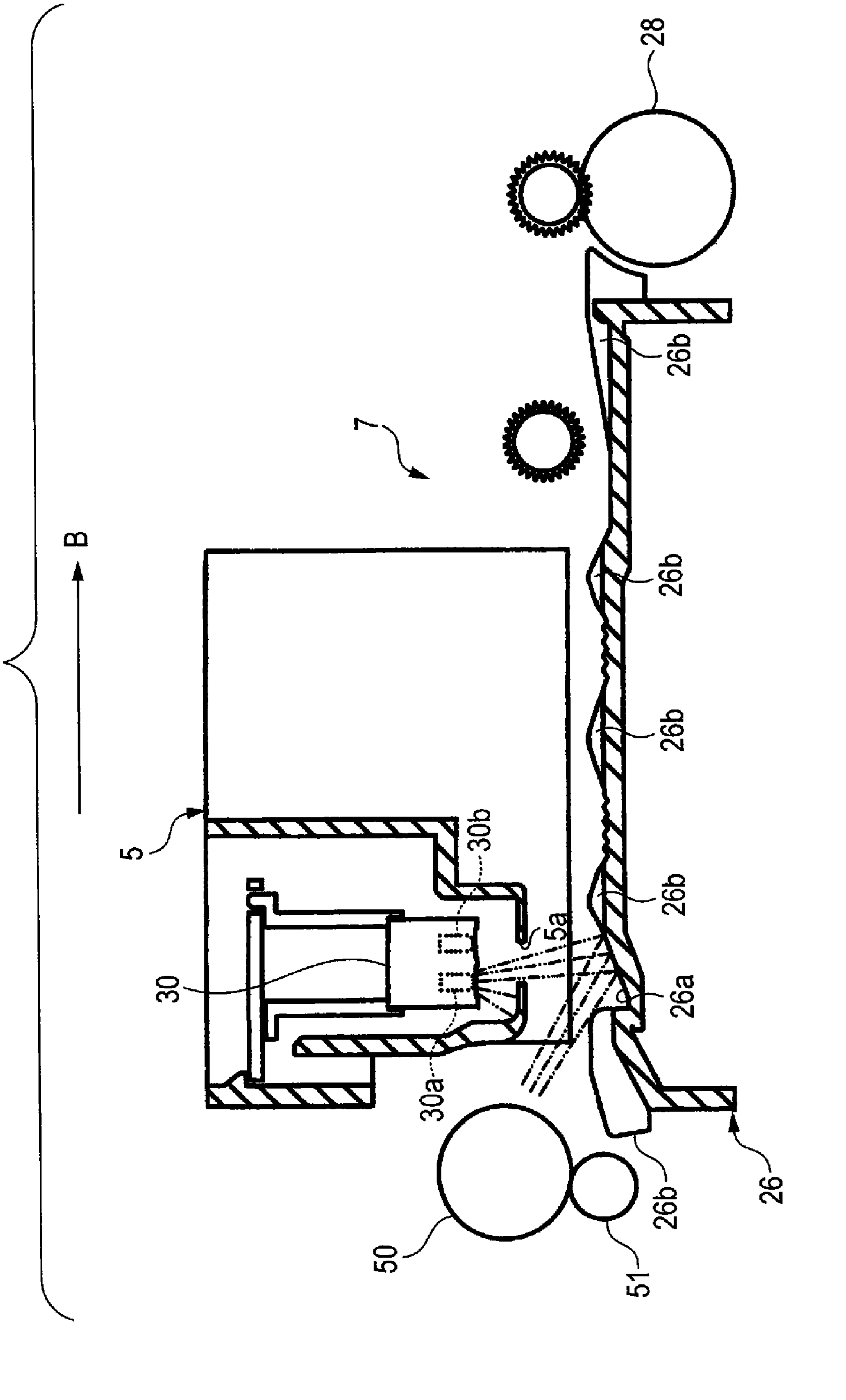
FIG. 5 is a sectional side diagram showing schematic configurations of a reflection type optical sensor and the platen according to the present invention.

The reflection type optical sensor 30 is disposed downward (to confront the platen 26) at a position on the left side of the carriage 5 in the main scanning direction (as shown in FIG. 3 and FIG. 5). This reflection type optical sensor 30 is provided with a light emitting unit 30*a* for emitting a light downward (e.g., toward the later-described reflection portion (26*a*) in the platen 26), and a light receiving unit 30*b* for detecting the reflected light of the light emitted by the light emitting unit 30*a*. Here, the light emitting unit 30*a* is arranged on the upstream side of the paper discharging direction (or in the arrow direction B) with respect to the light receiving unit 30*b* (as shown in FIG. 5). In the bottom portion of the carriage 5 and below the reflection type optical sensor 30, moreover, there is formed an aperture 5*a* (as shown in FIG. 5) for restricting the light irradiation range within the later-described reflection portion 26*a* of the platen 26 by transmitting only a portion of the light emitted by the light emitting portion 30*a*.

The platen 26 is injection-molded of a black resin so that a plurality of ribs 26*b* of a thin plate extending lengthwise in the paper discharging direction (or in the arrow direction B) are formed on the upper face of the platen 26 in the main scanning direction. As a result, the recording paper sheets P, as transferred on the upper face of the platen 26, are supported at the upper end portions of the ribs 26*b* so that they are smoothly transferred, because the contact area between the platen 26 and the recording paper sheets P is small as to reduce friction.

At a position opposing to the light emitting unit 30*a*, on the upper face of the platen 26, there is formed along the main scanning direction (as shown in FIG. 3 to FIG. 5) the reflecting portion 26*a* of a flat face, which is inclined downward to the upstream of the paper discharging direction (or in the arrow direction B) (that is, in which the distance from the recording paper sheet P supported on the upper face of the platen 26 increases in the direction from the light receiving unit 30*b* to the light emitting unit 30*a*). This reflecting portion 26*a* is formed into a smooth state having a ten-point average roughness Rz of 0.8 microns indicating the surface roughness, so as to suppress random reflections of the light emitted from the light emitting unit 30*a*. Here, the portions of the platen 26 other than the reflecting portion 26*a* are formed to have a surface roughness equivalent to those (having an Rz of about 25 to 3.2 microns) of general resin moldings.

In the complex apparatus 1 of this aspect as configured, the position of the leading end portion or the position of the side end portion of the recording paper sheet P, as transferred to the recording unit 7 (or the upper face of the platen 26), is detected by using the reflection type optical sensor 30. By the movement of the carriage 5 in the main scanning direction, specifically, the reflection type optical sensor 30 is moved to a position to detect the presence or absence of the recording paper sheets P, and the light is emitted from the light emitting unit 30*a*. Then, if the quantity of the reflected light detected at the light receiving unit 30*b* is at a threshold value or higher, it is decided that the recording paper sheet P exists in the irradiation target portion. The recording paper sheet P does not exist in the irradiation target portion if the quantity of the reflected light detected is lower than the threshold value. More specifically, in the case the recording paper sheet P exists, when the limit is emitted from the light emitting unit 30*a*, in the irradiation target portion, the light as reflected by the recording paper sheet P (generally in the white color) is detected by the light receiving unit 30*b* so that the quantity of the reflected light as detected by the light receiving unit 30*b* increases. When the recording paper sheet P is not present in that irradiation target portion when the light is emitted from the light emitting unit 30*a*, the light is reflected at the reflecting portion 26*a* of the platen 26. Here, the reflecting portion 26*a* of the platen 26 is inclined downward to the upstream of the paper feeding direction so that the light emitted from the light emitting unit 30*a* is reflected to the upstream side (to the side opposite to the light receiving unit 30*b*) of the paper discharging direction. Moreover, the reflecting portion 26*a* is formed to have a smooth surface by reducing the surface roughness, so that random reflection is also suppressed. This suppression extremely reduces the quantity of light to be reflected from the reflecting portion 26*a* to the light receiving unit 30*b*.

According to the complex apparatus 1 of this aspect as has been described, the quantity of the light to be detected by the light receiving unit 30*b* can be remarkably reduced while the recording paper sheet P is not present in the light irradiation target portion irradiated by the light emitting unit 30*a*. As a result, it is possible to improve the detection precision of the recording paper sheets P by the reflection type optical sensor 30.

Moreover, the platen 26 has a black color which effectively reduces to the quantity of reflected light thereby making it harder to cause detection errors.

Moreover, the irradiation range of the light to be emitted from the light emitting unit 30*a* is restricted by the aperture 5*a* as to what is contained in the reflecting portion 26*a*. As a result, it is possible to prevent the light from being reflected at portions of the platen 26 other than the reflecting portion 26*a* and detected by the light receiving unit 30*b*.

In addition, the platen 26 is made to have a smaller surface roughness only at the reflecting portion 26*a*, so that it can be manufactured less expensively than the configuration in which the surface roughness of the entire platen 26 is homogeneously reduced. In this configuration, moreover, the random reflection the light occurs in portions other than the reflecting portion 26*a* more easily than the reflecting portion 26*a*, so that the reflected light is dispersed to reduce quantities of reflected light in any predetermined direction. As a result, the disturbances are suppressed for the detection by the light receiving unit 30*b*.

Here in the complex apparatus 1 of the aforementioned aspect, the platen 26 corresponds to a medium supporting member and the carriage 5 (e.g., the bottom portion having the aperture 5*a*) corresponds to a diaphragm member.

Although the invention has been described above regarding particular aspects, it is natural that the invention can adopt various modes of such.

For example, the surface roughness Rz of the reflecting portion 26*a* is not limited to 0.8 microns but can be made smaller (e.g., 3.0 microns) than the surface roughness (i.e., the ten-point average roughness Rz of 25 to 3.2 microns) of the general plate 26 to thereby effectively suppress random reflection of the light. The effect of suppressing the random reflection of light is improved as the reflecting portion 26*a* has less surface roughness. If the surface roughness of the reflecting portion 26*a* is decreased, the manufacturing becomes more difficult. In the case of the injection-molding of a resin, therefore, it is preferable that the surface roughness Rz of the reflecting portion 26*a* is about 0.8 microns, as in the plate 26 of the aspect as described above.

Moreover, the inclined direction of the reflecting portion 26*a* in the platen 26 should not be limited to that of the aforementioned aspect, but the reflecting portion 26*a* may be so formed as to be inclined downward to the downstream of the paper discharging direction (or in the arrow direction B). In the configuration of this case, the light reflected by the reflecting portion 26*a* can be hardly detected by the light receiving unit 30*b*, as in the foregoing aspect, by arranging the light receiving unit 30*b* on the upstream side of the light emitting unit 30*a* in the paper discharging direction (or in the arrow direction B).

In the complex apparatus 1 of this aspect, moreover, the reflecting portion 26*a* capable of suppressing random reflection is formed by reducing the surface roughness of the platen 26 itself, to which the invention should not be limited. For example, the reflecting portion capable of suppressing random reflection may also be formed by fixing other parts (e.g., a plate member or seal), formed to have a surface roughness Rz of 3 microns or less, on the platen. Alternatively, the surface roughness of the reflecting portion may also be reduced by applying a clear coating for hiding flaws in the platen.

Figure 6:
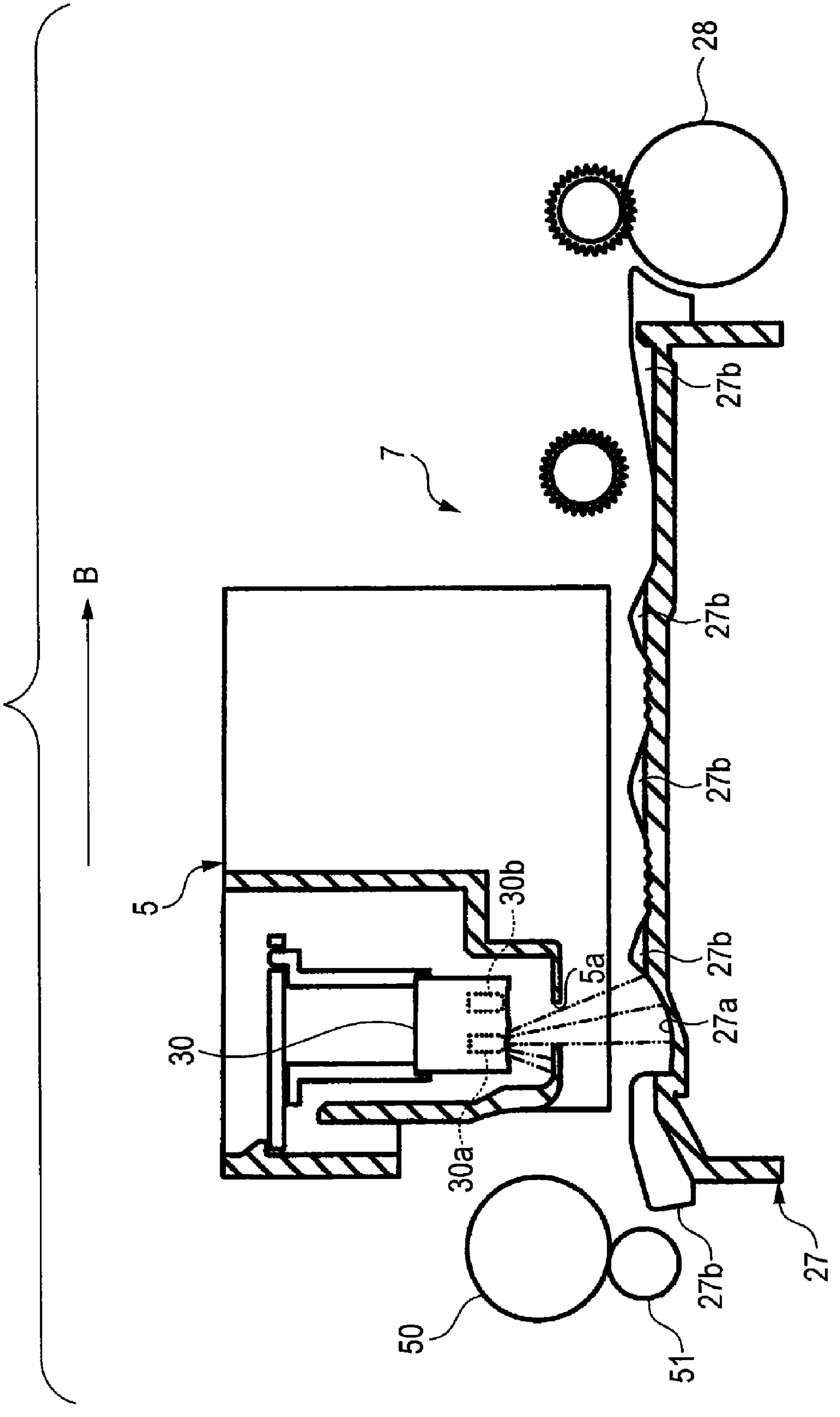
FIG. 6 is a sectional side diagram showing schematic configurations of a modified reflection type optical sensor and the platen according to another aspect of the present invention.

On the other hand, the shape of the reflecting portion should not be limited to the configuration of the foregoing aspect, but may also be formed into a curved face around the light emitting unit 30*a*, as shown in FIG. 6. Specifically, this reflecting portion 27*a* forms a part of the side face of a circular cylinder on the main scanning direction, and has a side section formed into an are on the light emitting unit 30*a* and inclined downward to the upstream of the paper discharging direction (or in the arrow direction B). Moreover, this reflecting portion 27*a* is formed, similar to the reflecting portion 26*a* of the aforementioned aspect, to have a ten-point average roughness Rz of about 0.8 microns. According to this configuration, the light, as emitted from the light emitting unit 30*a*, is reflected at the reflecting portion 27*a* in the direction to be condensed to the light emitting unit 30*a* (or to return to the light emitting unit 30*a*). As a result, it is possible to prevent the reflected light from being reflected again at another location in the complex apparatus 1 and accordingly from being detected at the light receiving unit 30*b*.

Here, other than a configuration in which the position of the side end portion of the recording paper sheet P is detected by mounting the reflection type optical sensor 30 on the carriage 5, as described in the foregoing aspect, there may be another configuration in which the reflection type optical sensor is disposed at a fixed position on the transfer passage of the recording paper sheets P thereby to detect the position of the leading end portion and the position of the trailing end portion of the recording paper sheet P being transferred. The invention can also be applied to such a configuration. In this case, the reflecting portion may also be formed into a spherical shape curved around the light emitting unit.

What is claimed is:

1. An image forming apparatus comprising:

a medium supporting member including:

a plurality of ribs that support a recording medium; and an irradiation target portion that has a smooth surface, wherein the irradiation target portion is formed to have a lower surface roughness than other portions different from the irradiation target portion of the medium supporting member; and wherein the irradiation target portion is formed such that a ten-point average roughness Rz, indicating a surface roughness, is 3 microns or less;

a light emitting unit that emits a light toward the irradiation target portion;

a light receiving unit that detects the reflected light of the light emitted by the light emitting unit; and a diaphragm member that reflects a portion of the light which is emitted by the light emitting unit and which is not directed to the irradiation target portion, to restrict an irradiation range of the light within the irradiation target portion, wherein:

a presence or absence of a recording medium in the irradiation target portion is detected based on a quantity of the reflected light; and the surface of the irradiation target portion has a slope inclined in a direction from the light receiving unit to the light emitting unit.

2. The image forming apparatus according to claim 1, wherein a ten-point surface roughness Rz indicating a surface roughness of other portions than the irradiation target portion is 3.2 to 25 microns.

3. The image forming apparatus according to claim 1, wherein the irradiation target portion is formed into a curved face around the light emitting unit.

4. The image forming apparatus according to claim 3, wherein the irradiation target portion is a part of an arc having a center at the light emitting unit.

5. The image forming apparatus according to claim 1, wherein the irradiation target portion has a black color.

6. The image forming apparatus according to claim 1, wherein the light emitting unit emits a light though an emitting opening, and wherein the diaphragm member has an opening which overlaps the emitting opening of the light emitting unit in a direction perpendicular to the recording medium to be supported by the medium supporting member.

7. The image forming apparatus according to claim 1, wherein the light emitting unit emits a light with an irradiation angle, and wherein the diaphragm member is provided within the irradiation angle.

8. The image forming apparatus according to claim 1, further comprising a plane between the surface of the irradiation target portion and the light emitting unit, which is parallel to a paper discharging direction, wherein a distance between the irradiation target portion and the plane is increased in a direction from the light receiving unit to the light emitting unit.

* * * * *